Sept. 17, 1940.   S. BUCKLEY   2,214,807
MOTOR CONTROL AND BRAKE MECHANISM
Filed May 1, 1940   2 Sheets-Sheet 1
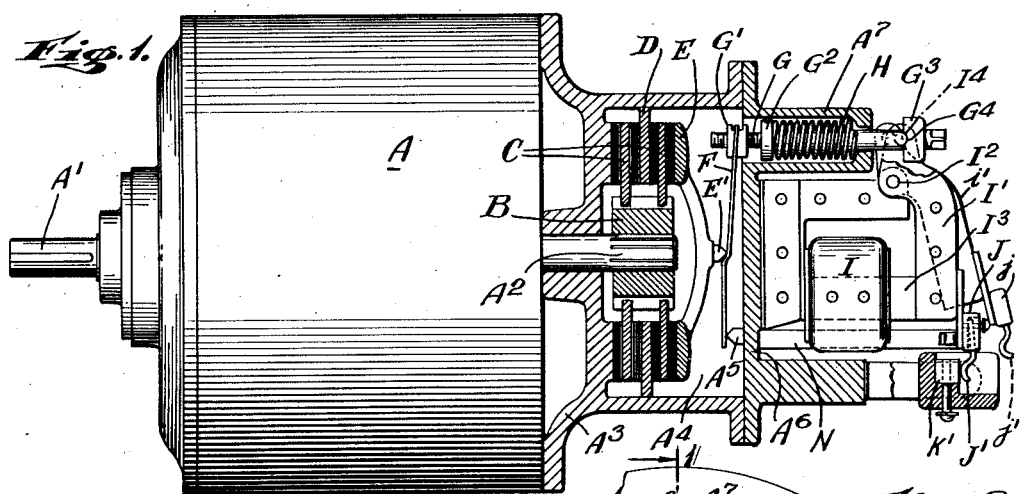
INVENTOR
SYDNEY BUCKLEY
BY
John E. Hubbell
ATTORNEY Sept. 17, 1940.　　　　　S. BUCKLEY　　　　　2,214,807
MOTOR CONTROL AND BRAKE MECHANISM
Filed May 1, 1940　　　　　2 Sheets-Sheet 2
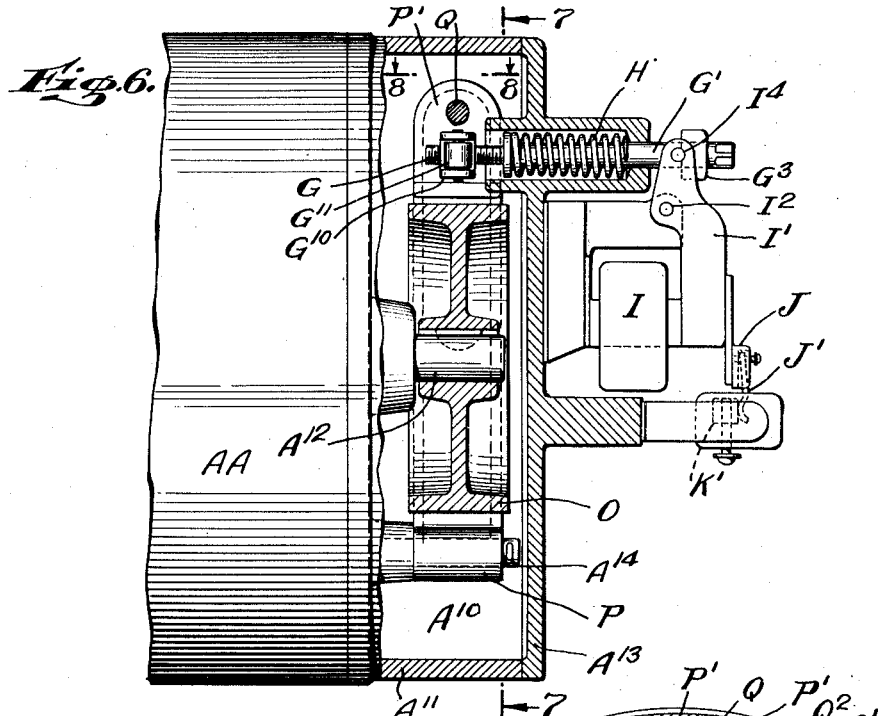
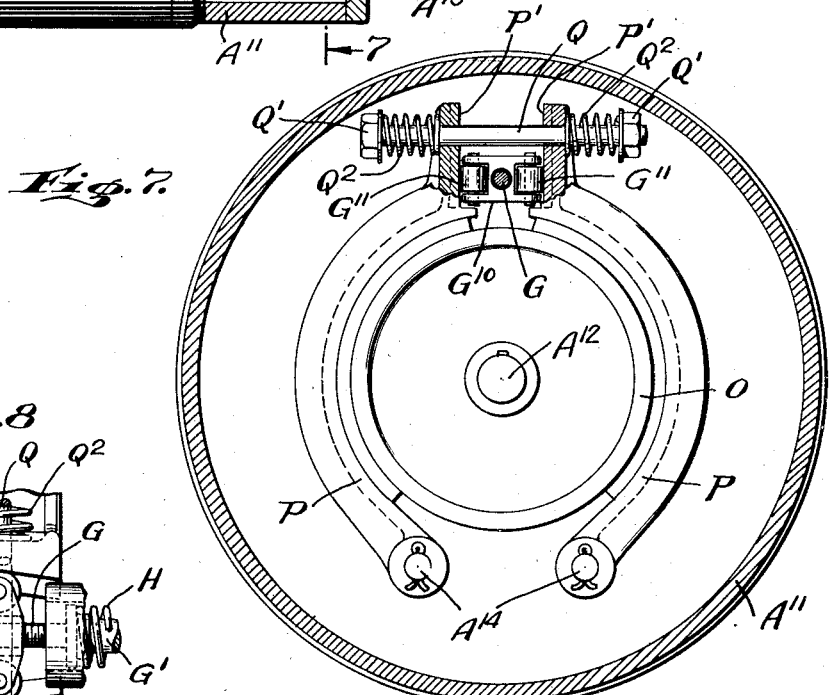
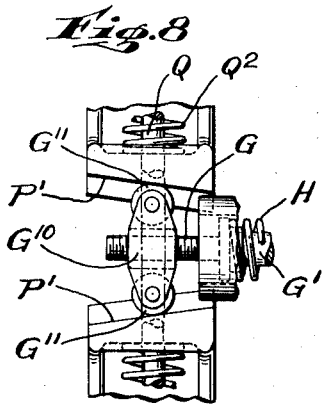
INVENTOR
*SYDNEY BUCKLEY*
BY
*John E. Hubbell*
ATTORNEY Patented Sept. 17, 1940

2,214,807

UNITED STATES PATENT OFFICE 2,214,807

MOTOR CONTROL AND BRAKE MECHANISM

Sydney Buckley, Philadelphia, Pa., assignor to Shepard Niles Crane & Hoist Corporation, Montour Falls, N. Y., a corporation of New York Application May 1, 1940, Serial No. 332,653

3 Claims. (Cl. 192—2)

The general object of the present invention is to provide a combined control and brake mechanism for use with an electric motor or motor mechanism provided with a brake on the motor shaft, or on some convenient shaft of the mechanism driven by the motor. My present invention was devised primarily for use in connection with electric hoist motors, but may be employed with advantage to control and brake electric motors and motor mechanisms used for a variety of purposes other than hoist purposes.

Electric motor driven hoist mechanisms are invariably provided with a brake which may act directly on the motor shaft on the hoisting drum shaft, or on some intermediate shaft, and customarily that brake, whether of the friction disc, brake shoe, or band type, is actuated by an electromagnet. Frequently also such motors are subject to remote switch control, and are directly energized and deenergized by a switch mechanism including an actuating electromagnet, but heretofore the brake and control mechanisms have been separate organizations including no common parts.

In accordance with the present invention, I combine the control and brake mechanisms for an electric motor mechanism in an organization including one electromagnet which, by its energization and deenergization, adjusts a switch mechanism through which the motor is energized for operation in one direction, and including a second electromagnet, which, when energized and deenergized, actuates a second switch mechanism controlling operation of the motor in a direction opposite to that first mentioned direction each of said electromagnets releasing and applying the motor brake mechanism as it energizes and deenergizes the motor.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is an elevation, partly in section on the broken line 1—1 of Fig. 2, of a hoist motor structure including a combined brake and control mechanism;

Fig. 2 is an end elevation of the motor shown in Fig. 1;

Fig. 3 is a partial plan view of the apparatus shown in Fig. 1;

Fig. 4 illustrates a partial plan section taken on the line 4—4 of Fig. 2;

Fig. 5 is a wiring diagram showing the brake control and motor energizing circuits of the arrangement shown in Figs. 1 and 2;

Fig. 6 is a partial elevation partly in section of the modified motor arrangement including a shoe brake;

Fig. 7 is a section on the line 7—7 of Fig. 6; and

Fig. 8 is a partial plan view of apparatus shown in Figs. 6 and 7.

In the drawings and referring first to the arrangement shown in Figs. 1-4, A represents an electric motor adapted for use as a hoist motor, or for some other purpose making an electrically actuated brake desirable. One end A' of the motor shaft is adapted to carry a power gear or other power transmitting element, and the hub B of a disc brake mechanism is secured on the other end $A^2$ of the motor shaft. The brake mechanism, as shown, comprises two brake wheels C, splined on the hub B, a non-rotatable brake ring D between the brake wheels, a brake disc E, coaxial with the wheel C and ring D, and a brake lining part at each side of each brake wheel. The disc E is movable axially of the motor shaft to compress the braking elements C and D between said disc and the portion of the motor end or head member $A^3$ which forms the inner end wall of a braking mechanism chamber $A^4$. At each side of each brake wheel C, is a corresponding brake lining part.

As shown, the brake disc E is moved to compress the braking element assembly and apply a braking force to the motor, by a lever F having one end in engagement with a fulcrum part $A^5$ carried by a head $A^6$, which normally closes the brake mechanism chamber. Intermediate its ends, the lever F engages an axial pivot portion E' of the brake disc E. The second end of the lever F is operatively connected to a nut G' on a spring bolt G, so as to share the movements of the nut in the axial direction of the spring bolt. The spring bolt G extends through a spring chamber $A^7$ formed in the head $A^6$ and is surrounded by a spring H, which has one end in engagement with the end wall of the chamber $A^7$ remote from the motor and has its other end in engagement with a collar or a spring abutment $G^2$ carried by the spring bolt, so that the spring constantly tends to compress the brake wheel and ring assembly, and thereby interrupt the operation of the motor.

The end of the bolt G remote from the lever F carries a crosshead G³ through which the bolt G is retracted to release the motor brake on the energization of either of two similar electromagnet comprising coils I and $i$ mounted side by side on the head A⁶. The energization of the electromagnet I retracts the bolt G through the action of a corresponding armature I' pivoted at I² to the magnet core I³. The armature I' carries a pin I⁴ through which it engages the crosshead G³. As shown, each of the armature pins I⁴ and $i^4$ when in operative engagement with the crosshead G³ extends into the corresponding end of a groove G⁴ formed in the member G³, and the bolt G is thus held against rotation since one or the other of the pins I⁴ and $i^4$ is normally received in the groove G⁴. The electromagnet including the coil $i$ may be exactly like that including the coil I, and includes parts $i'$, $i^2$, $i^3$ and $i^4$ corresponding respectively to the parts I', I², I³ and I⁴.

As collectively shown in Figs. 1 and 2, the armature I' has secured to its lower free end a contact plate or member of suitable insulation material J which supports contact fingers J', J² and J³. When the electromagnet coil I is energized, the contact fingers J', J² and J³ are brought into engagement with stationary switch contacts K', K² and K³, respectively, as shown in Fig. 1 and when the coil I is deenergized, the armature I' turns into the same angular position occupied in Fig. 1 by the armature $i'$ and thereby moves the contact fingers J', J² and J³ out of engagement with the stationary contacts K', K² and K³. The armature $i'$ has associated with it parts $j$, $j'$, $j^2$, $j^3$, $k$, $k^2$, $k^3$ similar in form and arrangement to the parts J, J', J², J³, K, K², K³, respectively.

As diagrammatically illustrated in Fig. 5, the stationary contacts K' and $k'$ are connected to the conductor 1, the contacts K² and $k^2$ are connected to the conductor 2, and the contacts K³ and $k^3$ are connected to the conductor 3, of a wire multiphase electric distribution system. The contact fingers J' and $j^3$, are connected to the terminal 4 of the motor A. The contact fingers J² and $j^2$ are connected to the terminal 5 of the motor A, and the contact fingers J³ and $j'$ are connected to the third terminal 6, of the motor A. As will be apparent, when the contact fingers J', J² and J³ engage the contacts K', K² and K³, the motor terminal conductors 4, 5 and 6 are connected to the supply conductors 1, 2 and 3. If the motor A is thereby energized to operate in one direction, for example, the hoisting direction, it will be energized for operation in the reverse or lowering direction with the contact fingers J', J² and J³ moved to open the energizing circuits just described, and the contact fingers $j'$, $j^2$ and $j^3$ moved into engagement with contacts $k'$, $k^2$ and $k^3$, respectively, since the motor terminal conductors 4, 5 and 6 will then be connected to the supply conductors 3, 2 and 1, respectively.

In the arrangement shown diagrammatically in Fig. 5, the motor is adapted for remote control by means of hoisting and lowering switches L and $l$, respectively, at a suitable push button or other control station. As diagrammatically shown, the switch L, when closed, connects the electromagnet coil I in a circuit comprising conductors 7, 8 and 9 and extending between the stationary contacts K² and K³. Similarly, the closure of the switch $l$ closes a circuit including the coil $i$ and conductors 7, 10, and 11, between the contacts K² and K³.

As will be apparent when neither of switches L and $l$ is closed, both of the electromagnet coils I and $i$ will be deenergized, and the spring H will then subject a brake actuating force to the brake disc E. With the switch $l$ open, the closure of switch L will energize the coil I and turn the armature I' clockwise, as seen in Fig. 1, to thereby retract the spring bolt G, and release the braking force, while at the same time moving the contact fingers J', J² and J³ into engagement with the stationary contacts K', K² and K³, and thus energizing the motor for operation in the hoisting direction. When, with the switch L open, and the switch $l$ closed, the coil $i$ will be energized and the armature $i'$ will retract the spring bolt G and release the brake, and at the same time will move the contact fingers $j'$, $j^2$, $j^3$ into engagement with the stationary contacts $k'$, $k^2$, $k^3$, and energize the motor for operation in the lowering direction.

Advantageously the mechanism includes safety provisions adapted to prevent accidental movement of either set of the contact fingers into engagement with the corresponding stationary contacts, while as a result of a previous actuation of one or the other of the switches L and $l$, the other set of contact fingers are in engagement with the associated stationary contacts. To this end, in the construction shown, I provide an interlocking lever M. The latter is pivotally supported by one end of a post N which has its other end anchored in the head A⁶. The lever M is shaped for the engagement of its ends with the contact supporting members J and $j$, in such manner that when either of said supporting members is in the position in which the contact finger supported by it are in engagement with the corresponding stationary contacts, the lever M will hold the other supporting members out of the position in which the contact fingers supported by it engage the cooperating stationary contacts.

The principles of the present invention may be utilized with braking mechanisms differing in type from that shown in Figs. 1–4, and with the braking force applied to a motor driven shaft which is not the motor shaft proper. Thus as shown for example in Figs. 6, 7 and 8, the brake may be of the pivoted brake shoe type, and may comprise a brake drum or wheel O connected to the shaft of a hoisting drum which may be gear connected to the hoist motor. As shown in Figs. 7, 8 and 9, the brake mechanism is mounted in a brake chamber A¹⁰ formed in the end head A¹¹ of a stationary frame member AA having a bearing for one end of the hoist drum shaft A¹². The outer end of the brake chamber A¹⁰ is normally closed by a head A¹³ which supports external brake and control mechanism parts identical with those similarly supported by the head A⁶ of the construction first described.

In the simple brake mechanism shown in Figs. 7, 8 and 9, the brake wheel O is engaged by arc-shaped brake shoes P, each having its lower end pivotally mounted on a corresponding post A¹⁴ carried by the housing member A¹¹. The upper ends of the shoes P are connected by a biasing device which, as shown, comprises a bolt 2 extending through the upper ends of the brake shoes P, and provided with relatively adjustable abutments Q' at its opposite ends, and comprises a helical spring Q² acting between each abutment Q and the adjacent brake shoe P. The bolt Q and each of its springs Q² thus bias each brake shoe for movement toward the other and into braking engagement with the brake wheel O.

The spring bolt G of the mechanism shown in Figs. 7, 8 and 9, supports at its inner end a nut $G^{10}$ which rotatably supports a cam roller at each side. The nut $G^{10}$ and cam rollers $G^{11}$ are interposed between opposing surfaces P′ of the upper end portions of the brake shoes P with each roller in engagement with the immediately adjacent surface P′. As shown best in Fig. 8, the two surfaces P′ are oppositely inclined to the axis of the spring bolt G, so that when the latter is retracted by either of the armatures I′ or i′, the rollers $G^{11}$ will cam the upper ends of the brake shoes P apart and thereby release their brake action on the wheel O, while when the spring bolt G is allowed to move inwardly, under the action of its spring H, the rollers $G^{11}$ permit the upper ends of the brake shoes to approach one another under the action of their biasing device Q, Q′ and $Q^2$, and thus apply a braking force to the shaft $A^{12}$.

As will be apparent to those skilled in the art, the use of the invention permits of a desirable practical simplification in the motor braking and control mechanism, and of a reduction in its construction cost, and in a saving of the space needed to accommodate the mechanism. Ordinarily, and as shown, the contact fingers J′, $J^2$, $J^3$, j′, $j^2$, $j^3$ are spring elements, and each set of spring fingers is adapted to engage and separate from the corresponding stationary contacts, respectively prior to the full release and application of the braking force.

While I have illustrated the use of the invention only in connection with a single speed alternating current motor, it will be apparent to those skilled in the art that the principles of the invention may be applied to direct current motors as well as to alternating current motors, and that by means of additional contactor units, the invention may be utilized in braking and controlling the operation of variable speed motors.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with an electric motor, of a mechanical brake adjustable to brake and release said motor, one set of contacts adjustable to energize and deenergize said motor for operation in one direction, a second set of contacts adjustable to energize said motor for operation in the reverse direction, a separate electromagnet associated with each set of contacts and adapted to simultaneously adjust those contacts and said brake, when energized and deenergized, and means for separately energizing and deenergizing each of said electromagnets.

2. The combination with an electric motor, of a mechanical brake adjustable to brake and release said motor, one set of contacts adjustable to energize and deenergize said motor for operation in one direction, a second set of contacts adjustable to energize said motor for operation in the reverse direction, a separate electromagnet associated with each set of contacts and adapted to simultaneously adjust those contacts and said brake when energized and deenergized, means for separately energizing and deenergizing each of said electromagnets, and interlocking means adapted on the adjustment of either of said sets of contacts into motor energizing relation to hold the other set of contacts out of motor energizing adjustment.

3. The combination with an electric motor, of a mechanical brake adjustable to brake and release said motor and including a brake actuating member spring biased for movement into a position which said brake is applied, one set of contacts adjustable to energize and deenergize said motor for operation in one direction, a second set of contacts adjustable to energize said motor for operation in the reverse direction, a separate electromagnet associated with each set of contacts and comprising an armature adapted when said electromagnet is energized to simultaneously adjust that set of contacts and to engage and retract said member and release said brake, and means for separately energizing and deenergizing each of said electromagnets.

SYDNEY BUCKLEY.